(12) United States Patent
Wisneski et al.

(10) Patent No.: US 10,480,239 B1
(45) Date of Patent: Nov. 19, 2019

(54) VEHICLE FRONT END STRUCTURE

(71) Applicant: FORD GLOBAL TECHNOLOGIES, LLC, Dearborn, MI (US)

(72) Inventors: Mark A. Wisneski, Dearborn, MI (US); Christopher M. Caron, Dearborn, MI (US); David Brian Glickman, Southfield, MI (US); Stuart C. Salter, White Lake, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/173,215

(22) Filed: Oct. 29, 2018

(51) Int. Cl.
  *B62D 25/12* (2006.01)
  *E05F 15/662* (2015.01)
  *B62D 25/10* (2006.01)

(52) U.S. Cl.
  CPC .......... *E05F 15/662* (2015.01); *B62D 25/105* (2013.01); *B62D 25/12* (2013.01); *E05Y 2900/536* (2013.01)

(58) Field of Classification Search
  CPC . B60R 25/00; B60R 25/04; B60R 2025/1013; B60R 21/38; B60R 2225/00; B60R 25/045; B60R 25/1004; B60R 25/102; B60R 25/104; Y10T 70/5907; Y10T 292/1052
  See application file for complete search history.

(56) References Cited

U.S. PATENT DOCUMENTS

| | | | |
|---|---|---|---|
| 5,806,620 A | 9/1998 | DeRees et al. | |
| 6,549,123 B1 | 4/2003 | Monahan et al. | |
| 7,730,990 B2 | 6/2010 | Boggess et al. | |
| 2013/0049403 A1* | 2/2013 | Fannon | E05B 83/24 296/193.11 |
| 2015/0284983 A1* | 10/2015 | Conner | E05F 15/60 318/3 |

FOREIGN PATENT DOCUMENTS

| | | |
|---|---|---|
| CN | 207045245 U | 2/2018 |
| JP | 2010058737 A | 3/2010 |

* cited by examiner

*Primary Examiner* — James A Shriver, II
*Assistant Examiner* — James J Triggs
(74) *Attorney, Agent, or Firm* — Vichit Chea; MacMillan, Sobanski & Todd, LLC

(57) ABSTRACT

A vehicle having a hood-grille assembly and a method of operating the hood-grille assembly may include actuating geared motors to release the hood-grille assembly, releasing a bolster from vehicle structure, if a transmission is in Park when an open-close request is received and the hood-grille assembly is closed. This may also include, after the geared motors release the hood-grille assembly, actuating power struts to pivot the hood-grille assembly to an open position. The automatic closing of the hood-grille assembly employs the geared motors and power struts to secure the bolster to the vehicle body.

17 Claims, 3 Drawing Sheets

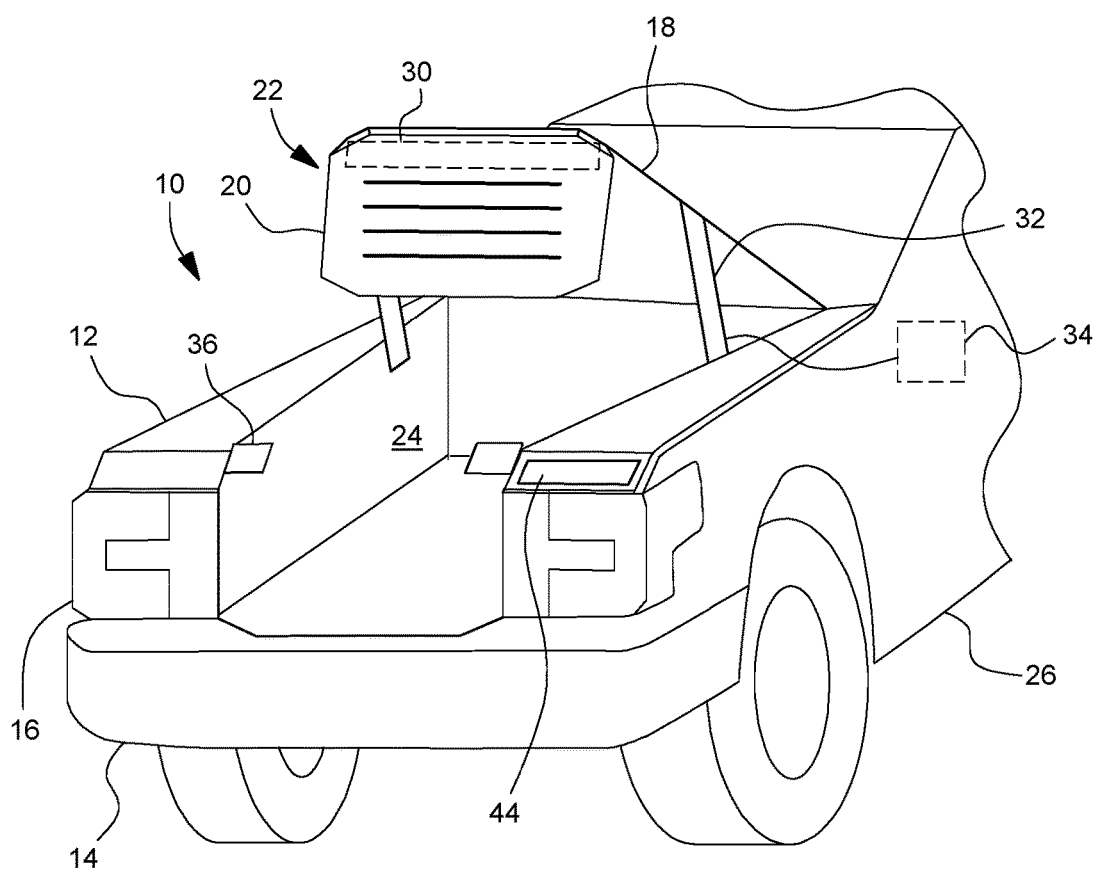
Fig. 1
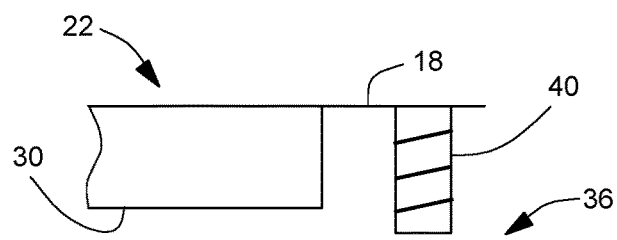
Fig. 2
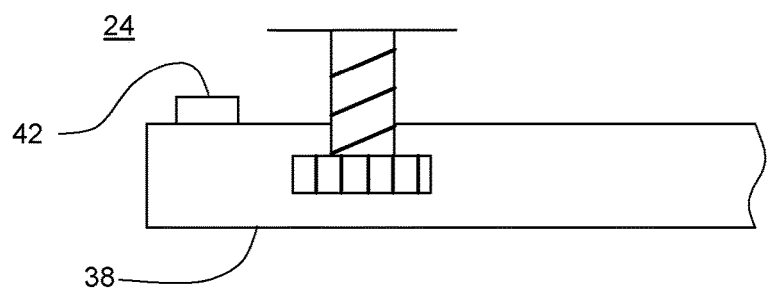

VEHICLE FRONT END STRUCTURE

BACKGROUND OF THE INVENTION

The present invention relates to a vehicle having a front trunk and more particularly to user access to the trunk.

Some vehicles include a front trunk, which may be due to the engine being located other than under a hood at the front of the vehicle, or due to the vehicle operating as a battery electric, in which case there is no engine under the hood.

In particular vehicle models, there may be customer options for an engine-based powertrain (gasoline, diesel, etc.), a hybrid electric powertrain or a pure battery electric powertrain. Due to cost efficiency, esthetics and functionality, the overall shape of the vehicle front end and structure may be maintained for all of the various powertrain options. For such vehicles, a hood and engine compartment is needed to receive and support the engine for the engine driven configuration of the vehicle. However, for the battery electric powertrain, then, the area where the engine is typically located may act as a front trunk for storage since no engine is present. Ease of access to this front trunk area is desirable.

SUMMARY OF THE INVENTION

An embodiment contemplates a method of operating a hood-grille assembly of a vehicle including: actuating geared motors to release the hood-grille assembly, releasing a bolster from vehicle structure, if a transmission is in Park when an open-close request is received and the hood-grille assembly is closed. This method may also include, after the geared motors release the hood-grille assembly, actuating power struts to pivot the hood-grille assembly to an open position.

An embodiment contemplates a vehicle having a body structure including front fenders; a hood-grille assembly including a hood pivotally mounted to the body structure, a grille fixed to the hood, and a bolster, laterally extending between the front fenders, fixed to the hood and pivotable with the hood; and geared motors configured to releasably secure the bolster to the body structure.

An advantage of an embodiment is that essentially the same vehicle structure and front end look may be employed for various drivetrain configurations of a vehicle, while providing ease of access to a front trunk for a battery electric powertrain configuration of the vehicle. The ease of access to the front trunk is provided while assuring that a bolster cross member provides the structural integrity for the vehicle. Also, the bolster fixed to the hood may allow for reducing the weight of the hood structure.

BRIEF DESCRIPTION OF THE DRAWINGS

FIG. 1 is a schematic perspective view of a front end of a vehicle showing a hood-grille assembly in an open position.

FIG. 2 is a schematic view of a latch mechanism.

DETAILED DESCRIPTION

Figure 3:
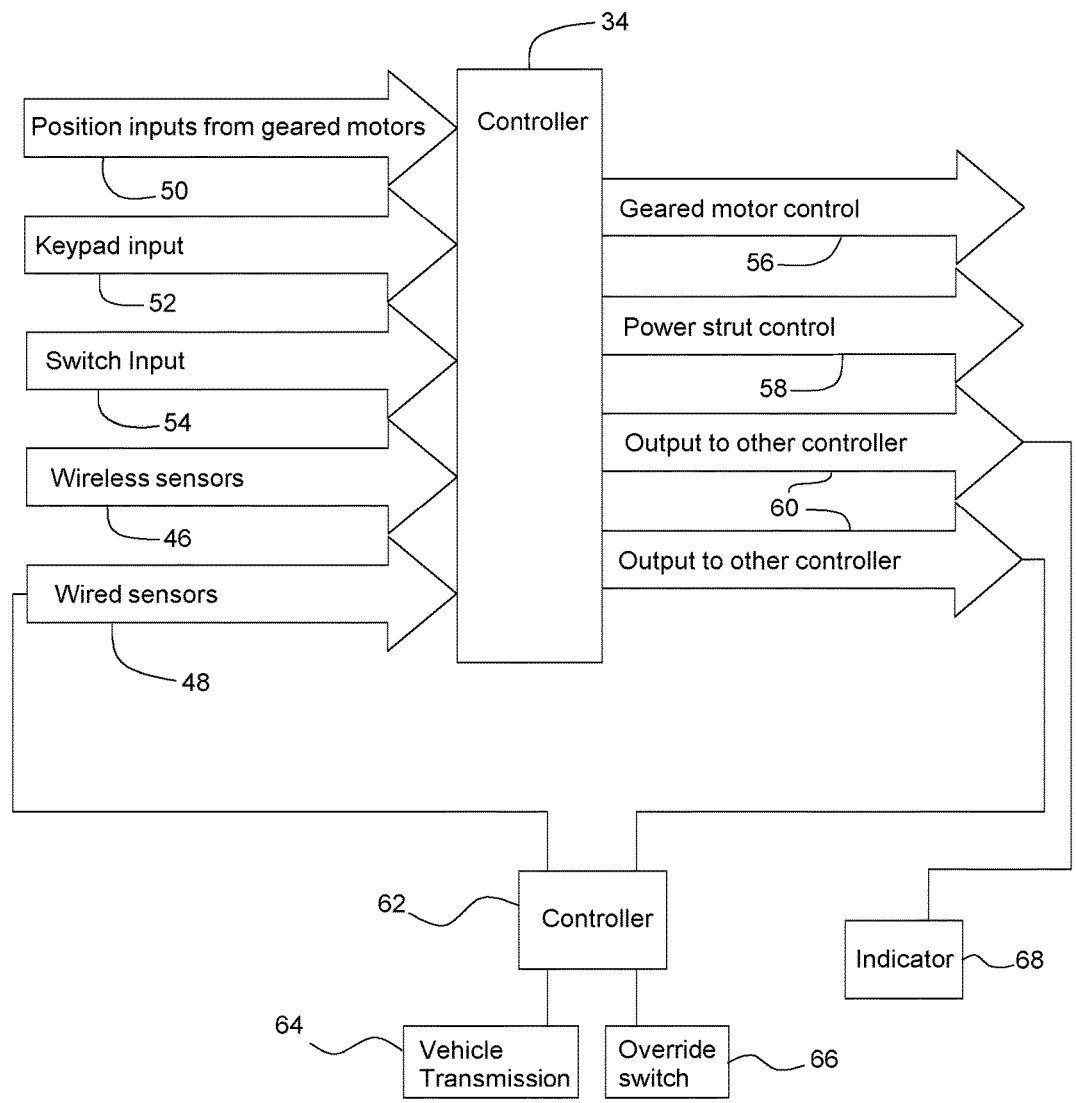
FIG. 3 is a schematic view of inputs/outputs of a controller.

FIGS. 1 and 2 illustrate a vehicle 10 having front fenders 12, a front bumper 14, headlights 16, a hood 18 and a grille 20. The vehicle 10 may be a pickup truck, although it may be a different type of vehicle if so desired. The hood 18 may be configured conventionally, if so desired, and pivot about conventional rear hinges (not shown). The hood 18 and grille 20 are fixed together to form a hood-grille assembly 22.

The grille 20 may be sized and shaped to match a grille in an engine driven model of this vehicle in order to maintain the same look and allow for essentially the same front end vehicle body structure for both models. While the grille 20 may be configured to look the same as other models from outside of the vehicle 10, it may have a solid inner surface in order to keep water out of a front trunk 24. The solid inner surface may be feasible in this battery electric vehicle 10, rather than having perforations, since no air flow is needed for engine cooling.

Vehicle body structure 26, which includes the front fenders 12 and front bumper 14, also includes a bolster 30. The bolster 30 extends laterally between the two front fenders 12, generally parallel to and above the front bumper 14. The bolster 30 is fixed to the hood 18 and grille 20, forming part of the hood-grille assembly 22. Thus, the hood-grille assembly 22 pivots all three components together as a unit when moving between open and closed positions.

Power operated struts 32 may be mounted between the body structure 26 and hood 18, with the struts 32 controlled by a controller 34 that activates the struts 32 to move the hood-grille assembly 22 between open and closed positions.

Latch mechanisms 36 may be employed to selectively secure the hood-grille assembly 22 to the body structure 26. The mechanisms 36 may include geared motors 38, which are mounted to body structure 26, that receives corresponding threaded posts 40, which are fixed to the hood-grille assembly 22. Each of the geared motors 38 is configured to receive a respective post 40 and rotate to pull the hood-grille assembly 22 securely against the body structure 26. When fully secured (and hence the hood-grille assembly 22 is in a closed position), the bolster 30 is then structurally secured at both ends to the body structure 26, providing structural support laterally between the fenders 12.

A switch 42 may be mounted adjacent to the latch mechanism 36 and configured to detect when the hood-grille assembly 22 is in the fully closed position. The switch 42 may be actuated by a portion of the hood-grille assembly 22 pressing against the switch 42 when in a fully closed position. The controller 34 may be in communication with the switch 42 to detect the open/closed state of the hood-grille assembly 22.

A keypad 44 may be mounted to the front of the vehicle 10 and in communication with the controller 34. The keypad 44 may be configured to allow one to actuate the keypad 44 to cause the controller 34 to open/close the hood-grille assembly 22.

FIG. 3 illustrates various vehicle sensors and other inputs that may be employed by the controller 34 to determine when to raise and lower the hood-grille assembly 22. The controller 34 may be a separate controller or may be incorporated into another vehicle controller, such as for example a vehicle body controller, if so desired.

The sensors that may provide inputs to the controller 34 may be, for example, position inputs 50 from the geared motors 36, which may be for example Hall effect sensors (or other similar types of sensors) that detect the positions of the geared motors 36. Since Hall effect sensors are known in the art, they will not be shown or discussed in detail herein. The keypad 44 and switch 42 may provide inputs 52, 54, respectively, to the controller 34. In addition, various wireless 46 and wired 48 sensors in the vehicle 10 may provide inputs to the controller 34. For example, one of the wired inputs 48 may include communication with a controller 62 that provides control for a vehicle transmission 64, which may include communication with an override switch 66.

The controller 34 may produce outputs 56, 58 for controlling the geared motors 38 and power struts 32, respectively, as well as outputs 60 that communicate with other controllers relating to various other vehicle systems. Such as, for example, the controller 62 that controls the transmission operation. Also, the outputs 60 may control indicators 68 the send messages to the vehicle operator, via, for example, a vehicle touch screen a mobile phone or other typical means of communicating with people.

Figure 4:
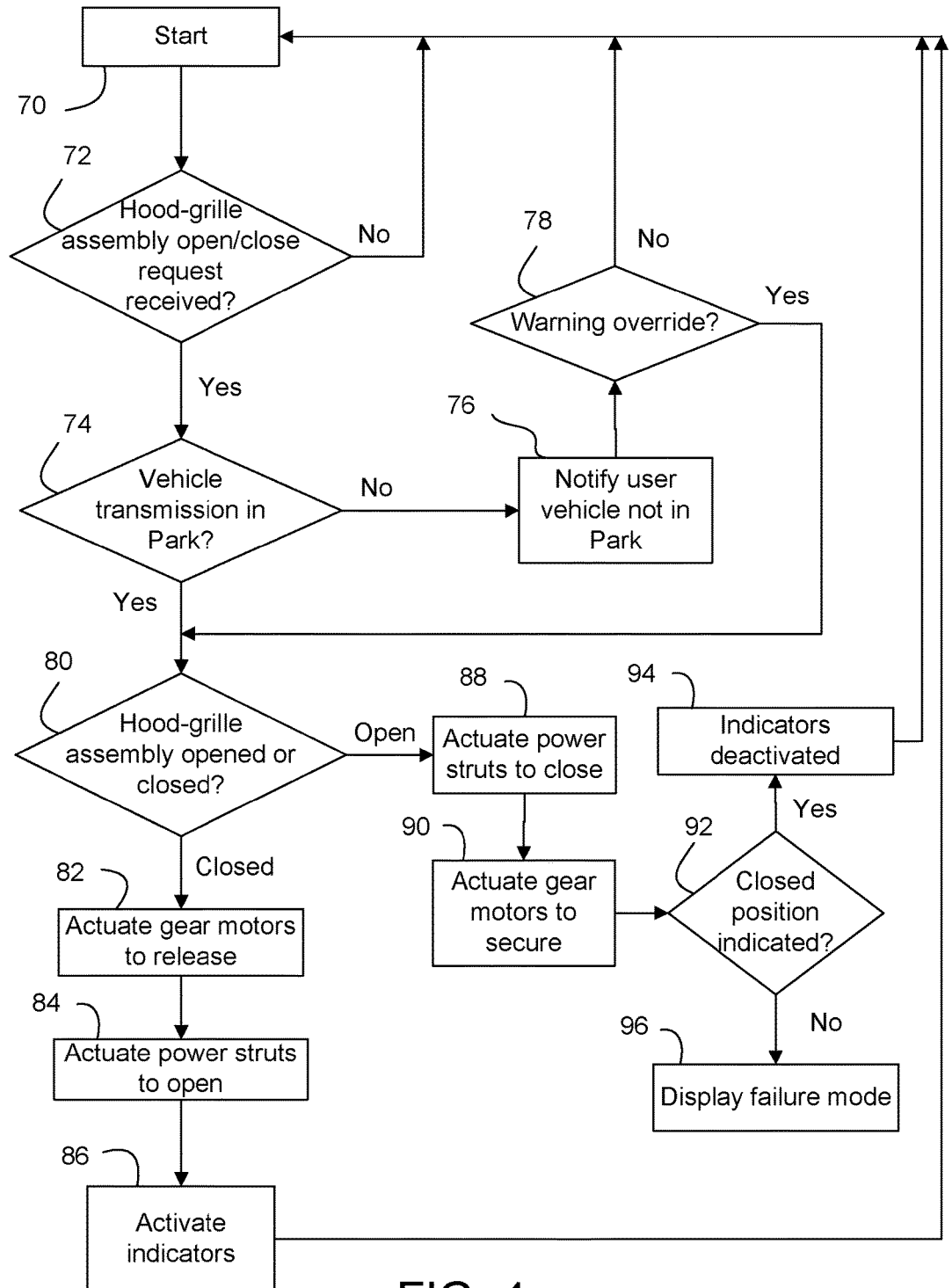
FIG. 4 is a flow chart relating to controlling the hood-grille assembly opening/closing operations.

FIG. 4 is a flow chart relating to opening/closing of the hood-grille assembly 22. The process starts, step 70, monitoring for a hood-grille assembly 22 open/close request from a person. The open/close request may be indicated by actuating the keypad 44, actuating a button/touchscreen inside the vehicle, a key-fob, via a remote phone application, or other similar types of communication with a vehicle controller.

A determination is made whether a hood-grille assembly open/close request is received, step 72. If no, then the process continues monitoring. If yes, then a determination is made as to whether the vehicle transmission 64 is in Park, step 74. If no, then a user notification that the vehicle 10 is not in Park is sent, step 76. A determination is made as to whether the user wishes to override the warning, step 78. If no, the process continues monitoring.

If either step 74 or 78 is yes, then a determination is made as to whether the hood-grille assembly 22 is currently open or closed, step 80. If closed, then the geared motors 38 are actuated to release the hood-grille assembly 22 to a slightly open position (secondary position), step 82, and the power struts 32 are activated to raise the hood-grille assembly 22 to the fully open position, step 84. In a step 86, an indicator 68 activates that may indicate to a person that the hood-grille assembly 22 is open and/or that the transmission 64 will remain in Park (i.e., generally prevented from switching into a gear unless specifically overridden by vehicle operator) while the hood-grille assembly 22 is open.

If in step 80 a determination is made that the hood-grille assembly 22 is open, then the power struts 32 are activated to lower the hood-grille assembly 22 to a slightly open position (secondary position), step 88, and the geared motors 38 are actuated to secure the hood-grille assembly 22 to the body structure 26 in a closed position, step 90.

A determination is made as to whether the switch 42 is actuated and the geared motor 38 indicates a closed position, indicating that the hood-grille assembly 22 is closed, step 92. This provides two separate indicators of a hood-grille assembly closed position for providing redundancy in making sure the hood-grille assembly 22 is actually closed and fully secured to the body structure 26. If yes, then the indicators 68 may be deactivated, step 94, and the process continues monitoring, step 70. If no, then one of the indicators 68 is activated to display a failure mode to the vehicle operator indicating a need for maintenance/repairs, step 96.

While certain embodiments of the present invention have been described in detail, those familiar with the art to which this invention relates will recognize various alternative designs and embodiments for practicing the invention as defined by the following claims.

The invention claimed is:

1. A method of operating a hood-grille assembly of a vehicle comprising:

actuating geared motors to release the hood-grille assembly, releasing a bolster from vehicle structure, if a transmission is in Park when an open-close request is received and the hood-grille assembly is closed; and
actuating power struts to pivot the hood-grille assembly to a secondary position if the transmission is in Park when an open-close request is received and the hood-grille assembly is opened.

2. The method of claim 1 further including:
actuating the power struts to pivot the hood-grille assembly to an open position after the geared motors release the hood-grille assembly.

3. The method of claim 2 wherein, upon releasing the hood-grille assembly, activating indicators signaling that the hood-grille assembly is not closed.

4. The method of claim 1 further including:
actuating the geared motors to release the hood-grille assembly, releasing the bolster from the vehicle structure, if the transmission is not in Park when the open-close request is received, the hood grille assembly is closed and a warning override is received.

5. The method of claim 1 further including:
after pivoting the hood-grille assembly to the secondary position, actuating geared motors to secure the hood-grille assembly in a closed position, securing the bolster to the vehicle structure.

6. The method of claim 5 further including:
displaying a failure mode if, after securing the hood-grille assembly in the closed position, the geared motors do not indicate the closed position and a switch contacting the hood-grille assembly does not indicate the closed position.

7. The method of claim 1 further including:
actuating the power struts to pivot the hood-grille assembly to the secondary position if the transmission is not in Park when the open-close request is received, the hood-grille assembly is opened and a warning override is received.

8. The method of claim 7 further including:
displaying a failure mode if, after securing the hood-grille assembly in a closed position, the geared motors do not indicate the closed position and a switch contacting the hood-grille assembly does not indicate the closed position.

9. The method of claim 1 further including:
preventing the transmission from shifting out of Park when the hood-grille assembly is released.

10. The method of claim 9 further including:
allowing the transmission to shifting out of Park when the hood-grille assembly is closed.

11. A vehicle comprising:
a body structure including front fenders;
a hood-grille assembly including a hood pivotally mounted to the body structure, a grille fixed to the hood, and a bolster, laterally extending between the front fenders, fixed to the hood and pivotable with the hood;
geared motors configured to releasably secure the bolster to the body structure, wherein the geared motors detect when the hood-grille assembly is closed; and
a switch configured to be actuated by the bolster when the hood-grille assembly is closed.

12. The vehicle of claim 11 further including power struts mounted between the hood and body structure, actuatable to raise lower the hood-grille assembly.

13. The vehicle of claim 11 further including a keypad mounted adjacent to a headlight configured to request opening-closing of the hood-grille assembly.

14. The vehicle of claim 11 including a controller configured to actuate the geared motors to release the hood-grille assembly, releasing the bolster from the body structure, if a transmission is in Park when an open-close request is received and the hood-grille assembly is closed.

15. The vehicle of claim 14 wherein the controller is also configured to actuate power struts to pivot the hood-grille assembly to an open position after the geared motors release the hood-grille assembly.

16. The vehicle of claim 14 wherein the controller is also configured to activate indicators signaling that the hood-grille assembly is not closed when the bolster is released from the body structure.

17. A vehicle comprising:
a body structure including front fenders;
a hood-grille assembly including a hood pivotally mounted to the body structure, a grille fixed to the hood, and a bolster, laterally extending between the front fenders, fixed to the hood and pivotable with the hood;
geared motors configured to releasably secure the bolster to the body structure; and
a keypad mounted adjacent to a headlight configured to request opening-closing of the hood-grille assembly.

* * * * *